US010100770B2

(12) United States Patent
Dudar (10) Patent No.: US 10,100,770 B2
(45) Date of Patent: Oct. 16, 2018

(54) SYSTEMS AND METHODS FOR ON-BOARD CYLINDER LEAKDOWN TESTING (71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 473 days.

(21) Appl. No.: 14/788,128

(22) Filed: Jun. 30, 2015

(65) Prior Publication Data
US 2017/0002761 A1 Jan. 5, 2017

(51) Int. Cl.
| F02D 41/22 | (2006.01) |
| F02D 41/30 | (2006.01) |
| F02D 35/02 | (2006.01) |
| F02D 41/00 | (2006.01) |
| F02M 25/06 | (2016.01) |
| F02M 25/08 | (2006.01) |
| F02D 13/02 | (2006.01) |
| F02D 41/40 | (2006.01) |
| F02B 23/10 | (2006.01) |

(52) U.S. Cl.
CPC ......... *F02D 41/22* (2013.01); *F02D 13/0207* (2013.01); *F02D 35/02* (2013.01); *F02D 41/0037* (2013.01); *F02D 41/3005* (2013.01); *F02M 25/06* (2013.01); *F02M 25/089* (2013.01); *F02B 23/104* (2013.01); *F02D 41/40* (2013.01); *F02D 2200/021* (2013.01); *F02D 2200/1015* (2013.01); *Y02T 10/18* (2013.01)

(58) Field of Classification Search
CPC .............. F02B 23/104; F02D 13/0207; F02D 2200/021; F02D 2200/1015; F02D 35/02; F02D 41/0037; F02D 41/22; F02D 41/3005; F02D 41/40; F02M 25/06; F02M 25/089
See application file for complete search history.

(56) References Cited

U.S. PATENT DOCUMENTS

| 5,351,526 | A | * | 10/1994 | Krohm | ................... F01N 11/00 |
| | | | | | 73/114.73 |
| 5,365,773 | A | * | 11/1994 | Graze, Jr. | ............... G01M 3/26 |
| | | | | | 73/47 |
| 5,531,100 | A | * | 7/1996 | Mezger | ................... F02B 77/08 |
| | | | | | 73/114.18 |
| 5,569,841 | A | * | 10/1996 | Hoban | .................. G01M 3/025 |
| | | | | | 73/114.16 |
| 5,633,458 | A | * | 5/1997 | Pauli | ...................... F02D 41/22 |
| | | | | | 701/105 |

(Continued)

*Primary Examiner* — David Hamaoui
*Assistant Examiner* — Carl Staubach
(74) *Attorney, Agent, or Firm* — Julia Voutyras; McCoy Russell LLP (57) ABSTRACT

Methods and systems are provided for performing an onboard cylinder leakdown test in response to an indication of cylinder misfire. In one example, following an engine-off event and an engine temperature above a threshold, fuel is injected into the indicated cylinder under conditions wherein the cylinder is expected to be sealed, and the detection of hydrocarbon migration out of the cylinder indicates cylinder degradation. In this way, cylinder degradation may be accurately diagnosed without intrusive, time consuming, and difficult off-board cylinder leakdown tests.

7 Claims, 5 Drawing Sheets

(56) References Cited

U.S. PATENT DOCUMENTS

| | | | |
|---|---|---|---|
| 6,594,987 B2* | 7/2003 | Uranishi | F01N 11/007 123/90.15 |
| 6,684,869 B2* | 2/2004 | Ponagai | F02D 41/16 123/680 |
| 7,233,845 B2* | 6/2007 | Veinotte | F02D 41/0045 123/520 |
| 7,581,433 B2 | 9/2009 | Sellers | |
| 7,861,515 B2 | 1/2011 | Brahma | |
| 7,913,546 B2* | 3/2011 | Vinci | G01M 15/05 73/114.23 |
| 8,612,120 B2* | 12/2013 | Katsumata | F02D 23/00 123/90.15 |
| 8,775,011 B2* | 7/2014 | Makki | F02D 41/1495 701/30.5 |
| 2003/0121316 A1* | 7/2003 | Wakahara | F01N 3/225 73/114.77 |
| 2004/0210379 A1* | 10/2004 | Kirschke | F02D 41/22 701/114 |
| 2005/0011185 A1* | 1/2005 | Annoura | F02D 41/0032 60/289 |
| 2007/0256478 A1* | 11/2007 | Guadagnola | G01M 3/3254 73/40 |
| 2009/0211545 A1* | 8/2009 | Satou | F01M 13/0011 123/41.86 |
| 2012/0065868 A1* | 3/2012 | Ando | F02D 41/221 701/103 |
| 2012/0265396 A1* | 10/2012 | Makki | F02D 41/144 701/30.8 |
| 2012/0316756 A1* | 12/2012 | Tsuyuki | F02D 35/023 701/104 |
| 2014/0136122 A1 | 5/2014 | Bowling et al. | |

* cited by examiner

SYSTEMS AND METHODS FOR ON-BOARD CYLINDER LEAKDOWN TESTING

FIELD

The present description relates generally to methods and systems for controlling a vehicle engine to determine a cause of degradation in a misfiring cylinder.

BACKGROUND/SUMMARY

In a four-stroke cycle engine, power is recovered from the combustion process in four separate piston movements (strokes) of a single piston, including intake, compression, power, and exhaust strokes. During the intake stroke, the intake valve is opened to introduce air into the combustion chamber. Similarly, during the exhaust stroke, the exhaust valve is opened to allow exhaust to be released from the combustion chamber. During the compression and power strokes, the intake and exhaust valves are maintained closed, thus sealing the combustion chamber and maximizing compression during the compression stroke and efficiently transferring the energy resulting from combustion into piston movement in the power stroke. If the combustion chamber is not sealed during the compression stroke, for example, a cylinder may lose most of its air/fuel mixture prior to ignition leading to what is commonly referred to as misfire.

Misfire is a common problem in internal combustion engines, resulting in poor performance, decreased fuel economy, increased emissions, etc. Misfires may result from poor cylinder compression due to a degraded intake valve, degraded exhaust valve, or degraded piston rings. Accordingly, it is imperative to accurately and easily diagnose whether an underperforming cylinder is a result of intake valve, exhaust valve, or piston ring degradation. Towards this end, an offboard cylinder leakdown test may be performed in which fuel flow is disabled to the indicated cylinder, spark plugs are removed, and shop air is introduced while monitoring for audible air leak. For example, U.S. Pat. No. 7,581,433 teaches an apparatus and method for detecting cylinder leaks in an internal combustion engine including a hose having an end configured for communication with a spark plug hole connecting to a cylinder to be tested and an end for attachment to a source of pressurized gas. However, the inventors herein have recognized potential issues with such a method. For example, the method is such that it must be performed offboard by specialists, and it is additionally intrusive, difficult, and time consuming. An attractive alternative therefore, is a method for an onboard cylinder leakdown test that does not require operator intervention.

In one example, the issues described above may be addressed by a method for a vehicle. During a first condition, including an engine-off condition, a quantity of fuel is injected into a first cylinder of the engine while maintaining an intake valve and an exhaust valve of the first cylinder closed, and indicating degradation of the first cylinder responsive to hydrocarbon migration out of the cylinder. In this way, cylinder degradation may be diagnosed without the requirement for an offboard test conducted by specialists.

As one example, the migration of hydrocarbon out of the cylinder may be indicated responsive to a change in temperature of a fuel vapor canister responsive to a vacuum applied to an engine intake. In this way, the location of the cylinder degradation may be determined, while preventing emissions resulting from hydrocarbon migration out of the cylinder in the vapor canister. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
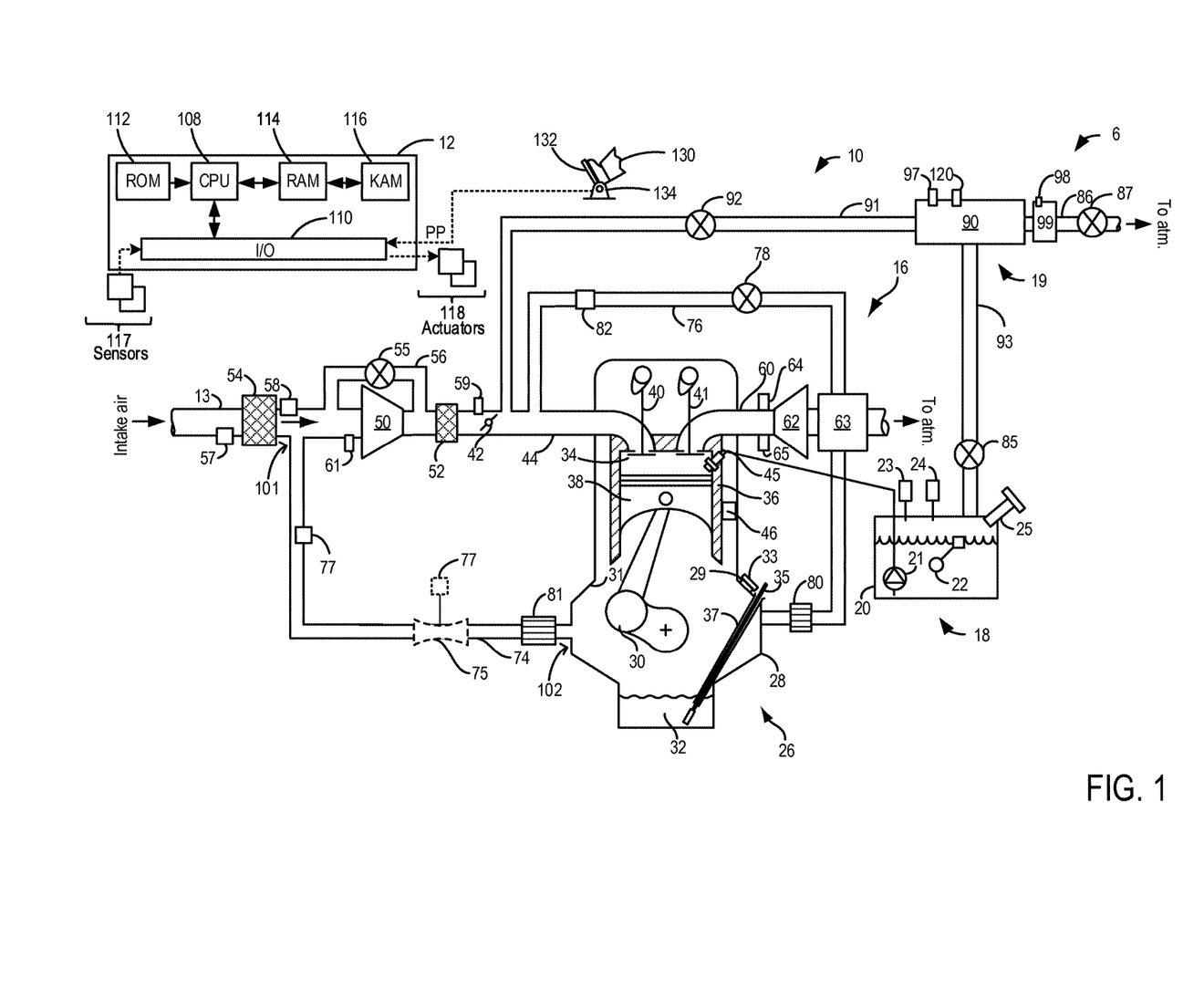
FIG. 1 shows a schematic description of an engine including an engine positive crankcase ventilation system (PCV).
Figure 2:
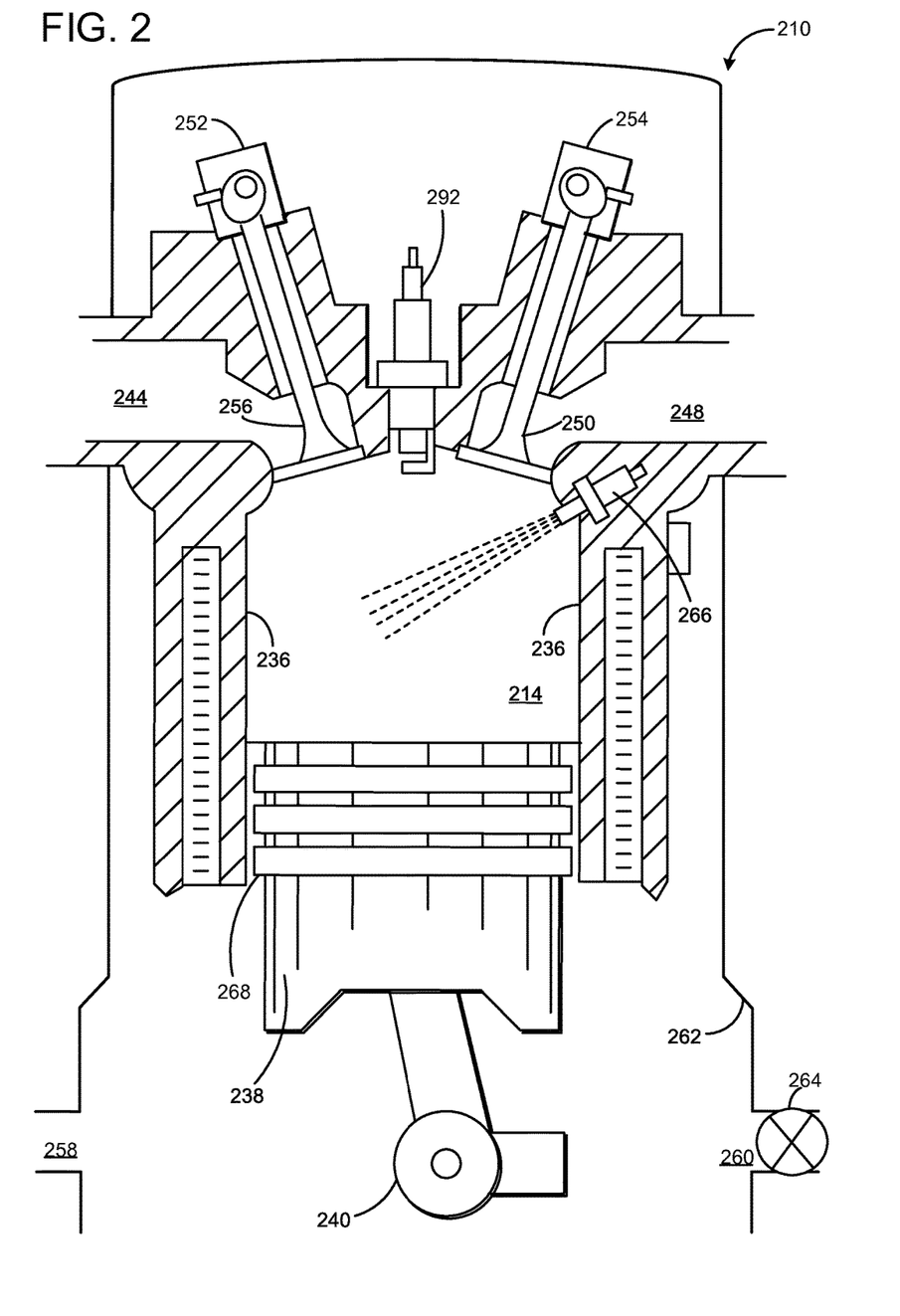
FIG. 2 shows a schematic description of one cylinder of a multi-cylinder engine.
Figure 3A:
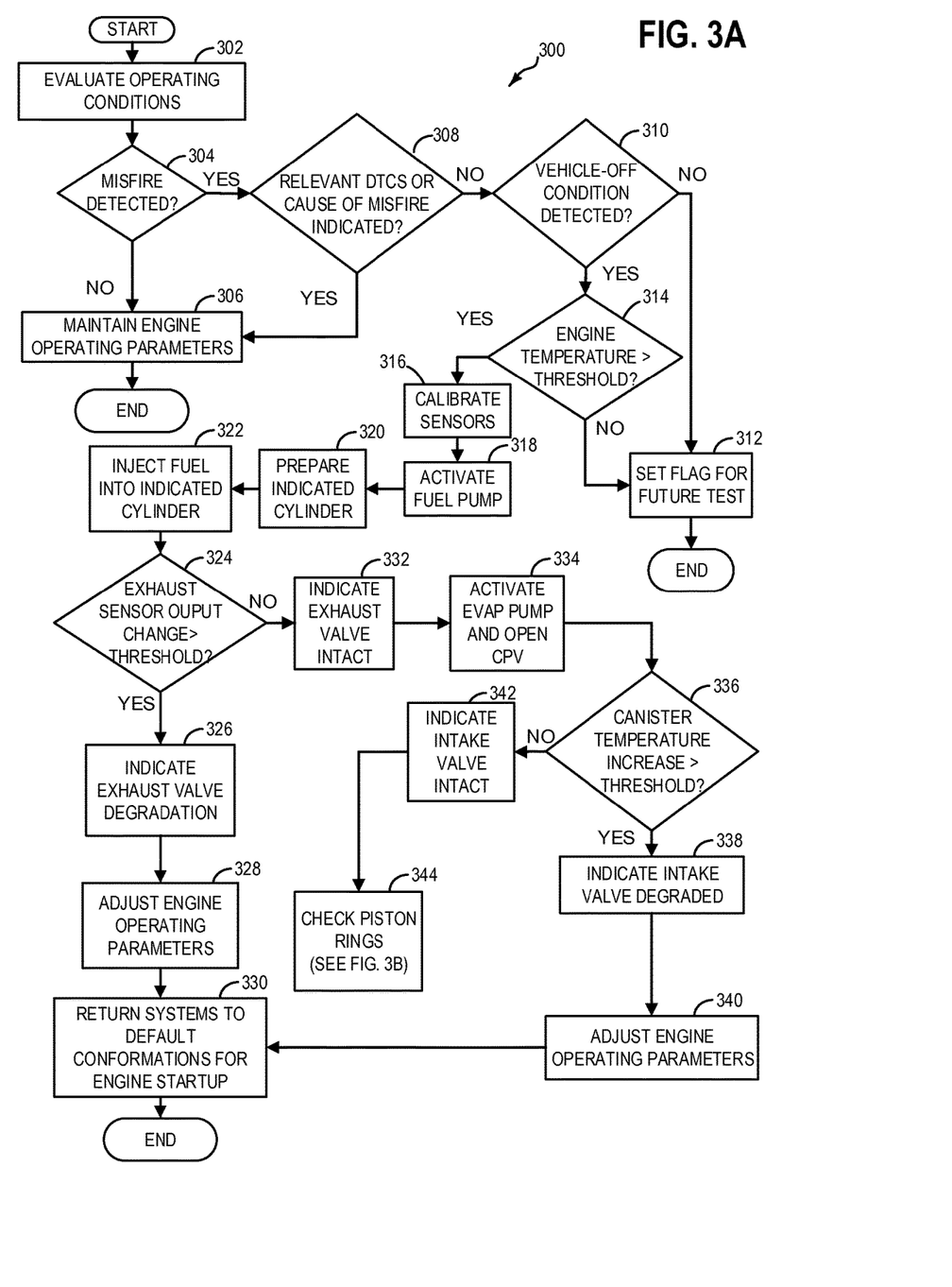
FIGS. 3A and 3B show a high level flow chart for a method for an onboard cylinder leakdown test.
Figure 3B:
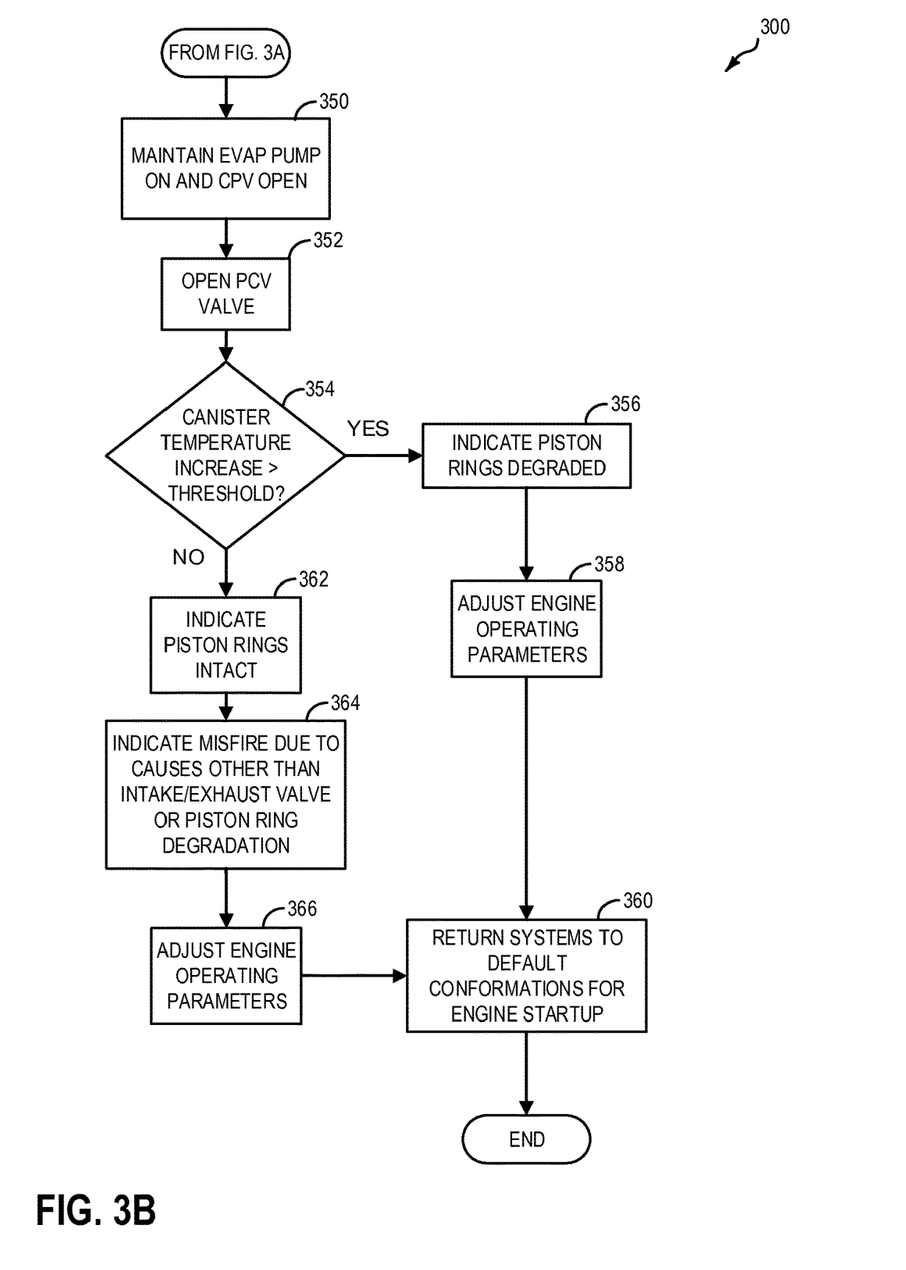

This description relates to systems and methods for performing an onboard cylinder leakdown test in order to diagnose cylinder misfire and/or underperformance due to poor compression. An engine including multiple cylinders may be coupled to a fuel system, exhaust system, intake system, evaporative emissions system, and crankcase ventilation system, as shown in FIG. 1. Cylinder misfiring may occur due to poor cylinder compression, which is often caused by leaky valves and/or piston rings, as shown in FIG. 2. Diagnosing this type of cylinder degradation typically requires a costly and timely off-board test. FIGS. 3A-3B depict an example method for diagnosing cylinder degradation with an on-board test. More specifically, the method provided diagnoses cylinder degradation by injecting a quantity of fuel into a hot cylinder following an engine-off event, while maintaining both intake and exhaust valves closed, and then monitoring hydrocarbon migration out of the cylinder. Hydrocarbon migration out of the cylinder via the cylinder exhaust valve may be monitored by the output of exhaust sensors, while hydrocarbon migration out of the cylinder via the cylinder intake valve or via a leaky piston ring may correspond to a change in temperature of a fuel vapor canister, as shown by the example timeline for a cylinder leakdown test presented in FIG. 4. In this way, in response to an indication of misfire due to poor compression, the affected cylinder may be diagnosed on-board as to whether intake valves, exhaust valves, or piston rings may be degraded.

Turning now to FIG. 1, a schematic depiction of a hybrid vehicle system 6 is presented that can derive propulsion power from engine system 10 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12.

A throttle 42 may be disposed in the engine intake to control the airflow entering intake manifold 44 and may be preceded upstream by compressor 50 followed by charge air cooler 52, for example. An air filter 54 may be positioned upstream of compressor 50 and may filter fresh air entering intake passage 13. The intake air may enter combustion chamber 34 via electrically-actuated intake valve system 40. Likewise, combusted exhaust gas may exit combustion chamber 34 via electrically-actuated exhaust valve system 41. In an alternate embodiment, one or more of the intake valve system and the exhaust valve system may be cam-actuated. The intake and exhaust valve systems are discussed in further detail herein and with reference to FIG. 2. Intake air may bypass compressor 50 via compressor bypass conduit 56, during conditions wherein compressor bypass valve (CBV) 55 is opened. In this way, pressure buildup at the compressor inlet may be relieved.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Engine exhaust 60 may further include one or more emission control devices 63 mounted in a close-coupled position. The one or more emission control devices may include a three-way catalyst, lean NOx trap, diesel particulate filter, oxidation catalyst, etc. In some examples, multiple exhaust gas sensors may be positioned both upstream and downstream of emission control device 63.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor. When configured as a pressure sensor, sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a PCV valve 78, which may be an electronically controlled valve that is controlled by controller 12. Additionally or alternatively, PCV line 76 may include a one-way valve (that is, a passive valve that tends to seal when flow is in the opposite direction) to prevent airflow from the intake manifold into the crankcase via PCV line 76 during boost conditions. In one embodiment, the PCV valve may actively or passively vary its flow restriction in response to the pressure drop across it (or flow rate through it). It will be appreciated that, as used herein, PCV flow refers to the flow of gases through PCV line 76 from the crankcase to the intake manifold. Similarly, as used herein, PCV backflow refers to the flow of gases through PCV line 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

The gases in crankcase 28 may consist of un-burned fuel, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 44.

Engine system 8 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor canister 90, via conduit 93, before being purged to engine intake manifold 44.

Fuel vapor canister 90 may be comprised in evaporative emissions system 19. Fuel vapor canister 90 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 90 may be purged to engine intake passage 13 by opening canister purge valve 92. A loading state of vapor canister 90 may be indicated by a hydrocarbon sensor 120. While a single canister 90 is shown, it will be appreciated that fuel system 18 may include any number of canisters. In one example, canister purge valve 92 may be a solenoid valve wherein opening or closing of the valve is performed via actuation of a canister purge solenoid.

Canister 90 may include a buffer (or buffer region), each of the canister and the buffer comprising the adsorbent. The volume of the buffer may be smaller than (e.g., a fraction of) the volume of canister 90. The adsorbent in the buffer may be same as, or different from, the adsorbent in the canister (e.g., both may include charcoal). The buffer may be positioned within canister 90 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 90 includes a vent 86 for routing gases out of the canister 90 to the atmosphere when storing, or trapping, fuel vapors from fuel tank 20. Vent 86 may also allow fresh air to be drawn into fuel vapor canister 90 when purging stored fuel vapors to engine intake passage 13 via purge line 91 and purge valve 92. While this example shows vent 86 communicating with fresh, unheated air, various modifications may also be used. Vent 86 may include a canister vent valve 87 to adjust a flow of air and vapors between canister 90 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be a default-open valve that is closed upon actuation of the canister vent solenoid. In some examples, an air filter may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 85 may be optionally included in conduit 93 such that fuel tank 20 is coupled to canister 90 via the valve. During regular engine operation, isolation valve 85 may be kept closed to limit the amount of diurnal or "running loss" vapors directed to canister 90 from fuel tank 20. During refueling operations, and selected purging conditions, isolation valve 85 may be temporarily opened, e.g., for a duration, to direct fuel vapors from the fuel tank 20 to canister 90. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 85 positioned along conduit 93, in alternate embodiments, the isolation valve may be mounted on fuel tank 20. The fuel system may be considered to be sealed when isolation valve 85 is closed. In embodiments where the fuel system does not include isolation valve 85, the fuel system may be considered sealed when purge valve 92 and canister vent valve 87 are both closed.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and isolation valve 85. In some embodiments, a pressure sensor may additionally be coupled between the canister 90 and the canister vent valve 87, such as pressure sensor 98, for example. In still further embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine. When a pressure sensor is included upstream of isolation valve 85, such as canister pressure sensor 98, an evaporative emissions system leak may be indicated based on changes in canister pressure during a leak diagnostic routine while isolation valve 85 is maintained closed.

One or more temperature sensors 24 may also be coupled to fuel system 18 for providing an estimate of a fuel system temperature. In one example, the fuel system temperature is a fuel tank temperature, wherein temperature sensor 24 is a fuel tank temperature sensor coupled to fuel tank 20 for estimating a fuel tank temperature. While the depicted example shows temperature sensor 24 directly coupled to fuel tank 20, in alternate embodiments, the temperature sensor may be coupled between the fuel tank and canister 90. A canister temperature sensor 97 may be coupled to canister 90 and configured to indicate temperature changes of the adsorbent material within the canister. As fuel vapor adsorption is an exothermic reaction and fuel vapor desorption is an endothermic reaction, the canister temperature may be used to indicate a quantity of fuel vapor adsorbed during a venting event (e.g., during refueling), and/or the quantity of fuel vapor desorbed during a purging operation. The canister temperature may thus be used to infer the canister load, while changes in canister temperature may be used to determine the capacity and/or integrity of the fuel vapor canister.

Fuel vapors released from canister 90, for example during a purging operation, may be directed into engine intake manifold 44 via purge line 91. The flow of vapors along purge line 91 may be regulated by canister purge valve 92, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 91 to prevent intake manifold pressure from flowing gases in the opposite direction of the purge flow. As such, the check valve may be necessary if the canister purge valve control is not accurately timed or the canister purge valve itself can be forced open by a high intake manifold pressure.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 85 and canister vent valve 87 while closing canister purge valve (CPV) 92 to direct refueling vapors into canister 90 while preventing fuel vapors from being directed into the intake manifold.

As another example, the fuel system may be operated in a refueling mode (e.g., when fuel tank refueling is requested by a vehicle operator), wherein the controller 12 may open isolation valve 85 and canister vent valve 87, while maintaining canister purge valve 92 closed, to depressurize the fuel tank before allowing enabling fuel to be added therein. As such, isolation valve 85 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 92 and canister vent valve while closing isolation valve 85. Herein, the vacuum generated by the intake manifold of the operating engine may be used to draw fresh air through vent 86 and through fuel vapor canister 90 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; exhaust temperature sensor 65; crankcase vent tube pressure sensor 77, BP sensor 57, CIP sensor 61, TIP sensor 59, canister temperature sensor 97, etc. Furthermore, controller 12 may monitor and adjust the position of various actuators 118 based on input received from the various sensors. These actuators may include, for example, throttle 42, intake and exhaust valve systems 40, 41, and PCV valve 78, CPV 92, FTIV 85, etc. Storage medium read-only memory 112 can be programmed with computer readable data representing instructions executable by processor 108 for performing the methods described below, as well as other variants that are anticipated but not specifically listed.

Controller 12 may also be configured to intermittently perform leak detection routines on fuel system 18 and/or evaporative emissions system 19 to confirm that the fuel system and evaporative emissions system are not degraded. Leak tests may be performed by an evaporative leak check module (ELCM) 99 communicatively coupled to controller 12. ELCM 99 may be coupled in vent 86, between canister 90 and the atmosphere. ELCM 99 may include a vacuum pump for applying negative pressure to the fuel system when administering a leak test. In some embodiments, the vacuum pump may be configured to be reversible. In other words, the vacuum pump may be configured to apply either a negative pressure or a positive pressure on the fuel system. ELCM 99 may further include a reference orifice and a pressure sensor 98. The reference orifice may enable a threshold pressure to be determined for a given leak size based on current ambient and operating conditions. Following the applying of vacuum to the fuel system, a change in pressure at pressure sensor 98 (e.g., an absolute change or a rate of change) may be monitored and compared to the threshold pressure. Based on the comparison, a fuel system leak may be diagnosed. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, and/or for a system with leaks of a predetermined size. Following a vehicle-off event, as heat continues to be rejected from the engine into the fuel tank, the fuel tank pressure will initially rise. During conditions of relatively high ambient temperature, a pressure build above a threshold may be considered a passing test.

Further, controller 12 may be configured to intermittently perform leak detection routines on the crankcase ventilation system. This may include monitoring an output of crankcase vent line pressure sensor 77 when pre-determined conditions are met. For example, during engine cranking, intake manifold vacuum may be low. As such, the PCV valve may be open, causing a threshold flow of air through the crankcase and back into the intake manifold. As the engine speed increases following cranking, the manifold airflow increases. This may decrease the airflow through the crankcase vent line. In a V-type engine, this sequence of events causes a characteristic dip in the crankcase vent line pressure. However, if the crankcase vent line is disconnected at the crankcase side (e.g., second side 102), the characteristic dip may not be observed, and degradation of the crankcase vent line may be indicated.

FIG. 2 depicts an example embodiment of a combustion chamber or cylinder that may be included in engine 210, which may be configured similarly to engine 10 as described herein, and depicted in FIG. 1. Cylinder (i.e. combustion chamber) 214 may include combustion chamber walls 236 with piston 238 positioned therein. Piston 238 may include one or more piston rings 268. The one or more piston rings 268 may function to seal cylinder 214, to assist with piston heat transfer, and to regulate oil consumption, for example. Piston 238 may be coupled to crankshaft 240 so that reciprocating motion of the piston is translated into rotational motion of the crankshaft. Crankshaft 240 may be coupled to at least one drive wheel of the passenger vehicle via a transmission system. Further, a starter motor may be coupled to crankshaft 240 via a flywheel to enable a starting operation of engine 210, and/or to rotate the engine in an unfueled mode.

Cylinder 214 can receive intake air via intake air passage 244, which may be one of a plurality of intake air passages coupled to cylinder 214. Intake air passage 244 may communicate with other cylinders of engine 210 in addition to cylinder 214. In some embodiments, one or more of the intake passages may include a boosting device such as a turbocharger or a supercharger. Exhaust passage 248 can receive exhaust gases from cylinder 214 as well as from other cylinders of engine 210.

Each cylinder of engine 210 may include one or more intake valves and one or more exhaust valves. For example, cylinder 214 is shown including at least one intake poppet valve 256 and at least one exhaust poppet valve 250 located at an upper region of cylinder 214. In some embodiments, each cylinder of engine 210, including cylinder 214, may include at least two intake poppet valves and at least two exhaust poppet valves located at an upper region of the cylinder.

Intake valve 256 may be controlled by a controller via actuator 252. Similarly, exhaust valve 250 may be controlled by a controller via actuator 254. During some conditions, the controller may vary the signals provided to actuators 252 and 254 to control the opening and closing of the respective intake and exhaust valves. The position of intake valve 256 and exhaust valve 250 may be determined by respective valve position sensors (not shown). The valve actuators may be of the electric valve actuation type or cam actuation type, or a combination thereof, as described with reference to FIG. 1. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by a controller to vary valve operation. For example, cylinder 214 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 214 can have a compression ratio, which is the ratio of volumes within the cylinder between when piston 238 is at bottom center and at top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 210 may include a spark plug 292 for initiating combustion. An ignition system (not shown) can provide an ignition spark to cylinder 214 via spark plug 292 in response to a spark advance signal from a controller, under select operating modes. However, in some embodiments, spark plug 292 may be omitted, such as where engine 210 may initiate combustion by auto-ignition or by injection of fuel as may be the case with some diesel engines.

In some embodiments, each cylinder of engine 210 may be configured with one or more fuel injectors for providing fuel thereto. As a non-limiting example, cylinder 214 may include two fuel injectors (e.g., a port fuel injector and a direct fuel injector). Fuel injector 266 is shown coupled directly to cylinder 214 for injecting fuel directly therein in proportion to a pulse width of a signal received from a controller via an electronic driver. In this manner, fuel injector 266 provides what is known as direct injection (hereafter referred to as "DI") of fuel into cylinder 214. While FIG. 2 shows injector 266 as a side injector, it may also be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 266 from a high pressure fuel system including a fuel tank, fuel pumps, a fuel rail, etc. Alternatively, fuel may be delivered by a single stage fuel pump at lower pressure, in which case the timing of the direct fuel injection may be more limited during the compression stroke than if a high pressure fuel system is used.

Fuel may be delivered to the cylinder during a single cycle of the cylinder. Directly injected fuel may be delivered during an intake stroke as well as partly during a previous exhaust stroke. Further, the direct injected fuel may be delivered as a single injection or as multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

A positive crackcase ventilation (PCV) system, may be coupled to the engine intake so that gasses in the crankcase 262 may be vented in a controlled manner from the crankcase. As described for PCV system 16 with reference to FIG. 1, engine 210 may include a crankcase ventilation tube 258, and a PCV line 260 in order to vent gasses out of the crankcase 262 and into intake manifold. In some examples PCV line 260 may include PCV valve 264, which may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

As described above, FIG. 2 shows only one cylinder of a multi-cylinder engine. As such each cylinder may similarly include its own set of intake/exhaust valves, fuel injector(s), spark plug, piston rings, etc.

A common failure mode in internal combustion engines is misfire. Typical causes of misfire include leaky or plugged fuel injectors, fouled spark plugs, degraded ignition coils, poor cylinder compression, etc. Misfire due to poor cylinder compression may be indicated by an onboard power balance test that runs with the engine combusting and which computes RPM contribution of each cylinders power stroke using the crankshaft position sensor (CPK) as input. Another test to indicate poor cylinder compression is the relative compression test. The relative compression test, for which prior art methods exist, uses a high amperage current probe to measure battery current during a crank event, as a cylinder with poor compression will not draw as much current as healthy cylinders. However, diagnosis as to the cause of poor cylinder compression, for example leaky intake valves, exhaust valves, or piston rings, is typically performed by an offboard cylinder leakdown test involving the disabling of fuel flow to the cylinder, removal of spark plugs, installation of a pressure gage, and introduction of air into the cylinder. For example, the misfiring cylinder may be placed at top dead center (TDC) with both intake and exhaust valves closed, such that the escape of the introduced air indicates leaky intake or exhaust valves, or leaky piston rings. As this offboard cylinder leakdown test is intrusive, difficult, and time consuming, an onboard cylinder leakdown test is desirable to diagnose the cause of cylinder misfire due to poor compression. It is an object of the present invention to provide a method for an onboard cylinder leakdown test to diagnose misfire related to leaky intake valves, exhaust valves, or piston rings.

A flow chart for a high-level example method 300 for an onboard cylinder leakdown test is shown in FIG. 3. More specifically, method 300 may be used to indicate cylinder degradation responsive to hydrocarbon migration out of the cylinder responsive to fuel injection into a hot cylinder following an engine-off condition. Method 300 will be described with reference to the systems described herein and shown in FIGS. 1-2, though it should be understood that similar methods may be applied to other systems without departing from the scope of this disclosure. Method 300 may be carried out by a controller, such as controller 12 in FIG. 1, and may be stored at the controller as executable instructions in non-transitory memory.

Method 300 begins at 302 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 304, method 300 includes determining whether a cylinder misfire event has occurred. A cylinder misfire event may be detected based on one or more of crankshaft acceleration, exhaust air-fuel ratio, output of an exhaust gas oxygen sensor, and spark plug ionization (e.g., ionization current as determined by an ionization sensor coupled to the spark plug). As another example, the controller may monitor an engine misfire rate over a predetermined duration (e.g., time or number of engine cycles) of engine operation or predetermined distance of vehicle travel such that the misfire rate may be compared to a threshold rate. A threshold rate may be determined, for example, based on the engine's misfire history. In some embodiments, indicating the cylinder responsible for a misfire event may be determined based on cylinder firing order. If misfire is not detected, method 300 proceeds to 306. At 306 the method 300 includes maintaining engine operating parameters. For example, fuel injection to the cylinders and spark timing may be maintained in a current operating status. Method 300 may then end.

If misfire is indicated at 304, method 300 proceeds to 308 where it is determined whether vehicle operating conditions are indicated that may compromise the integrity of method 300, or that may indicate a cause for misfire other than poor cylinder compression. For example, the controller may determine whether any relevant diagnostic trouble codes or flags have been set, indicating primary or secondary coil leaks, evap system leaks such as a fuel tank leak or fuel vapor canister leak, injector circuit or fuel pump, etc. If vehicle operating conditions are indicated that may compromise the integrity of method 300, or a cause for misfire has been determined, method 300 proceeds to 306, and includes maintaining engine operating parameters. For example, engine operating parameters may be maintained in a current status dictated by methods corresponding to an indicated evap system leak, injector circuit DTCs, etc. Method 300 may then end.

Alternatively, if misfire is indicated at 304 and vehicle operating conditions that may compromise the integrity of method 300 or directly contribute to misfire are not indicated, method 300 may proceed with testing the indicated cylinder for leak. At 310, method 300 includes determining whether a vehicle-off condition is detected. A vehicle-off condition may be indicated by a key-off event, a user setting a vehicle alarm following exiting a vehicle that has been parked or other suitable indicator. In some examples, certain vehicle-on, engine-off conditions those which may occur in a hybrid vehicle operating in battery-only mode may be sufficient to proceed with the cylinder leakdown test. If a vehicle-off condition is not detected, method 300 proceeds to 312. At 312, the controller may set a flag for a future test. For example the flag may be a flag indicating that a misfire event has been detected and that the cause for misfire has not been diagnosed. As such, the flag may thus prompt the controller to resume method 300 upon indication of a vehicle-off condition. Method 300 may then end.

If a vehicle-off condition is detected at 310, method 300 proceeds to 314. At 314, method 300 includes determining whether an engine temperature is greater than a threshold temperature. The engine temperature may be measured, estimated, or inferred, for example based on an engine coolant temperature. The threshold temperature may be a temperature whereby fuel injection into an engine cylinder is expected to cause a threshold amount of the injected fuel to volatize. The threshold may thus be based on fuel type, fuel volatility, fuel Reid vapor pressure, etc. In an example of a multifuel engine, more than one threshold may be indicated based on the volatility of differing fuel types. Alternatively, one threshold may be set based on the selective use of the more volatile fuel type, for example. If an engine temperature is less than the threshold temperature, method 300 proceeds to 312, and includes setting a flag for a future test. For example the flag may indicate that a misfire event has been detected and that the cause for misfire has not been diagnosed. The flag may thus prompt the controller to resume method 300 upon indication of a vehicle-off condition where an engine temperature is indicated to be above a threshold. Method 300 may then end.

If an engine temperature is determined to be greater than the threshold, method 300 proceeds to 316. At 316, method 300 includes calibrating one or more vehicle sensors based on the current operating conditions. The one or more vehicle sensors may include one or more exhaust oxygen and/or hydrocarbon sensors, one or more canister temperature and/or hydrocarbon sensors, and/or other sensors utilized throughout method 300. Calibrating vehicle sensors may include determining a current vapor canister temperature via a canister temperature sensor, such as sensor 97 in FIG. 1, and determining canister loading state via a HC sensor embedded in the canister, such as HC sensor 120 in FIG. 1. Additionally, calibrating vehicle sensors may include determining a current exhaust temperature via an exhaust temperature sensor such as exhaust temperature sensor 65 in FIG. 1, and determining an exhaust gas air/fuel ratio via a linear oxygen sensor or UEGO (universal or wide-range exhaust gas oxygen), a two-state oxygen sensor or EGO, a HEGO (heated EGO), a NOx, HC, or CO sensor, such as sensor 64 indicated in FIG. 1. Further, calibrating vehicle sensors may include setting baselines for canister temperature and loading state, as well as baselines for exhaust temperature and A/F ratio such that the baseline values may be stored in the controller. Baseline values may then be used to set threshold values such that cylinder leaks may be diagnosed according to method 300. In some examples, calibrating vehicle sensors may first include purging the cylinders and intake manifold of residual fuel, such that volatization of residual fuel or escape of residual exhaust does not falsely indicate hydrocarbon migration out of the misfiring cylinder being tested. For example, a pump may be utilized to evacuate hydrocarbons from the engine cylinders to a fuel vapor canister or to catalyst. In another example, the engine may be spun unfueled using an electric motor in order to flush residual fuel from the intake manifold into the cylinders for partial combustion and then moved to the catalytic converter. As such, vehicle sensors may be calibrated without contamination from residual fuel. Following vehicle sensor calibration, method 300 then proceeds to 318, where the fuel pump is activated. The activation of fuel pump at 318 includes maintaining an FTIV closed, (e.g., FTIV 85 in FIG. 1), such that vapors are blocked from migrating from the fuel tank to the canister while the cylinder leak test is proceeding.

Continuing at 320, method 300 includes preparing the cylinder in which misfire was indicated for leak detection. As described, indicating misfire in a particular cylinder may be based on firing order, for example, and may be indicated by a code or flag stored at the controller. Preparing the cylinder may include spinning the engine unfueled using an electric motor such that the affected cylinder is positioned at TDC, and commanding the intake and exhaust valves closed. Additionally, intake and exhaust valves for the other, non-affected cylinders may be commanded closed, further ensuring that any small amount of residual fuel is properly contained and will thus not migrate out of the engine during the leakdown test.

Continuing at 322, method 300 includes injecting fuel into the indicated cylinder while maintaining the indicated cylinder at TDC with intake and exhaust valves closed. Fuel is injected at 322 in the absence of spark plug-induced ignition, thus fuel sprayed into the cylinder may contact the hot cylinder walls, the wall temperature above a threshold as indicated at 314. Accordingly, as wall temperature is above a threshold, HC light chains may volatize and migrate out of the cylinder provided there is a leak pathway. As such, following injecting fuel into the indicated cylinder, method 300 proceeds to 324, where method 300 includes determining whether an exhaust sensor output change is greater than a threshold change. For example, method 300 may include determining an exhaust gas air/fuel ratio via a linear oxygen sensor or UEGO (universal or wide-range exhaust gas oxygen), a two-state oxygen sensor or EGO, a HEGO (heated EGO), a NOx, HC, or CO sensor, such as sensor 64 indicated in FIG. 1, and comparing the value of the measured ratio to the baseline value determined at 316. An output change above a threshold may be defined as a predetermined value indicating that a defined fraction of fuel expected to volatize under the given conditions has migrated to the exhaust sensor.

If exhaust sensor output change is greater than a threshold, method 300 proceeds to 326, where exhaust valve degradation is indicated. Continuing at 328, method 300 includes adjusting engine operating parameters. For example, method 300 may include adjusting engine operating parameters based on the indicated exhaust valve degradation. As such, an exhaust valve degradation flag may be set to inhibit fuel flow and spark to the cylinder experiencing valve degradation, for example. If the engine is a variable displacement engine, the cylinder may be deactivated during predetermined engine operating conditions, and variable displacement control methods adjusted accordingly.

Continuing at 330, method 300 includes returning systems to default conformations for engine startup. For example, fuel pump such as fuel pump 21 in FIG. 1 may be deactivated, and the FTIV such as FTIV 85 in FIG. 1 may be commanded open. The engine may be spun unfueled to place the engine in a default starting conformation. The degraded cylinder may thus be moved from TDC, and one or more of the intake valve and exhaust valve commanded open, depending on the default starting conformation and the engine operating condition adjustments made based on the exhaust valve degradation.

Returning to 324, if the exhaust sensor output change is not greater than a threshold, method 300 proceeds to 332 where it is indicated that the exhaust valve of the misfiring cylinder is intact. The exhaust sensor output may be monitored for a predetermined duration, or until an exhaust sensor output plateaus. Indicating that the exhaust valve of the misfiring cylinder is intact may include recording the passing test at the controller, and may further include adjusting an exhaust valve leak test schedule. Continuing at 334, method 300 includes activating a vacuum pump, such as the vacuum pump coupled within ELCM 99 in FIG. 1, and opening a CPV, such as CPV 92 in FIG. 1. The vacuum pump may be activated in a manner such that a vacuum is applied to the fuel vapor canister, the purge line, and the engine intake via the open CPV. In some examples, a throttle valve (such as throttle valve 42 shown in FIG. 1) may be closed or maintained closed so that a vacuum is generated within the engine intake. Further, a PCV valve, compressor bypass valve, EGR valve, etc. may be closed or maintained closed so that the vacuum is directed towards the engine cylinders. Additionally, at 334 method 300 includes maintaining the FTIV closed, and maintaining the misfiring cylinder at TDC with both intake and exhaust valves commanded closed such that the cylinder is sealed.

Continuing at 336, method 300 includes determining whether a canister temperature increase is above a threshold value. The threshold value may be predetermined, or may be based on operating conditions, such as the canister load, expected fuel vapor, etc. For example, the threshold may be set based on a defined value above the baseline canister temperature value and canister loading state value determined at 316. If the canister temperature increase is greater than a threshold, method 300 proceeds to 338 and intake valve degradation is indicated. Continuing at 340, method 300 includes adjusting engine operating parameters. For example, method 300 may include adjusting engine operating parameters based on the indicated intake valve degradation. As such, an intake valve degradation flag may be set to inhibit fuel flow and spark to the cylinder experiencing valve degradation. If the engine is a variable displacement engine, the cylinder may be deactivated during predetermined engine operating conditions, and variable displacement control methods adjusted accordingly.

Continuing at 330, method 300 includes returning systems to default conformations for engine startup. For example, fuel pump such as fuel pump 21 in FIG. 1 may be deactivated, and the FTIV such as FTIV 85 in FIG. 1 may be commanded open. The engine may be spun unfueled to place the engine in a default starting conformation. The degraded cylinder may thus be moved from TDC, and one or more of the intake valve and exhaust valve commanded open, depending on the default starting conformation and the engine operating condition adjustments made based on the intake valve degradation. Additionally, CPV, such as CPV 92 in FIG. 1 may be commanded closed, and a vacuum pump, such as the vacuum pump coupled within ELCM 99 in FIG. 1, may be deactivated.

If the canister temperature increase is not greater than a threshold at 336, method 300 proceeds to 342 and the intake valve is indicated to be intact. The canister temperature may be monitored for a predetermined duration, or until a canister temperature plateaus. Indicating that the intake valve of the misfiring cylinder is intact may include recording the passing test at the controller, and may further include adjusting an intake valve leak test schedule. Continuing at 344 the method includes determining whether piston rings are degraded (see FIG. 3B). Alternatively, if at 344 it is determined that the vehicle is not equipped with an electric PCV valve, the method may proceed to 330 wherein a flag may be set indicating the need for further evaluation as a result of a detected but undiagnosed misfire event. Further, at 330, method 300 includes returning systems to default conformations for engine startup.

Method 300 then continues at 350, shown in FIG. 3B. At 350, method 300 includes maintaining the vacuum pump on and the CPV open, and further includes maintaining the cylinder at TDC with both intake and exhaust valves commanded closed such that the cylinder is sealed. Continuing at 352, method 300 includes opening a PCV valve, such as PCV valve 78 in FIG. 1.

Continuing at 354, method 300 includes determining whether a canister temperature increase is greater than a threshold. The threshold value may be predetermined, or may be based on operating conditions, such as the canister load, expected fuel vapor, etc. For example, the threshold may be set based on a defined value above the baseline canister temperature value and canister loading state value determined at 316. If it is determined that the canister temperature increase is greater than a threshold, the method proceeds to 356 where piston ring degradation is indicated. Continuing at 358, method 300 includes adjusting engine operating parameters. For example method 300 may include adjusting engine operating parameters based on the indicated piston ring degradation. As such, a piston ring degradation flag may be set to inhibit fuel flow and spark to the cylinder experiencing valve degradation, for example. If the engine is a variable displacement engine, the cylinder may be deactivated during predetermined engine operating conditions, and variable displacement control methods adjusted accordingly.

Continuing at 360, method 300 includes returning systems to default conformations for engine startup. For example, fuel pump such as fuel pump 21 in FIG. 1 may be deactivated, and the FTIV such as FTIV 85 in FIG. 1 may be commanded open. The engine may be spun unfueled to place the engine in a default starting conformation. The degraded cylinder may thus be moved from TDC, and one or more of the intake valve and exhaust valve commanded open, depending on the default starting conformation and the engine operating condition adjustments made based on piston ring degradation. Additionally the CPV may be commanded closed, and the vacuum pump may be deactivated. Further, PCV valve, such as PCV valve 78 in FIG. 1, may be commanded closed.

If canister temperature increase is not greater than a threshold at 354, method 300 proceeds to 362 and intact piston rings are indicated. The canister temperature may be monitored for a predetermined duration, or until a canister temperature increase plateaus. Indicating that the piston rings of the misfiring cylinder are intact may include recording the passing test at the controller, and may further include adjusting a piston ring leak test schedule. As such, method 300 did not attribute the misfire event to one or more of leaky exhaust valve, leaky intake valve, or leaky piston rings. Continuing at 364, method 300 therefore includes indicating misfire due to causes other than intake/exhaust valve or piston ring degradation. For example, misfire may result from spark plug hot fouling as a result of fuel additive accumulation, or spark fouling due to soot accumulation, as one example. Additional testing of the misfiring cylinder and associated components may thus be indicated.

Continuing at 366, method 300 includes adjusting engine operating parameters. For example method 300 may include adjusting engine operating parameters based on the method 300 failing to diagnose the misfire event. As such, a flag may be set to follow-up on the misfire event with other tests to diagnose the misfire event.

Continuing at 360, method 300 includes returning systems to default conformations for engine startup. For example, fuel pump such as fuel pump 21 in FIG. 1 may be deactivated, and the FTIV such as FTIV 85 in FIG. 1 may be commanded open. The engine may be spun unfueled to place the engine in a default starting conformation. The degraded cylinder may thus be moved from TDC, and one or more of the intake valve and exhaust valve commanded open, depending on the default starting conformation and the engine operating condition adjustments made based on piston ring degradation. Additionally the CPV may be commanded closed, and the vacuum pump may be deactivated. Further, PCV valve, such as PCV valve 78 in FIG. 1, may be commanded closed.

Figure 4:
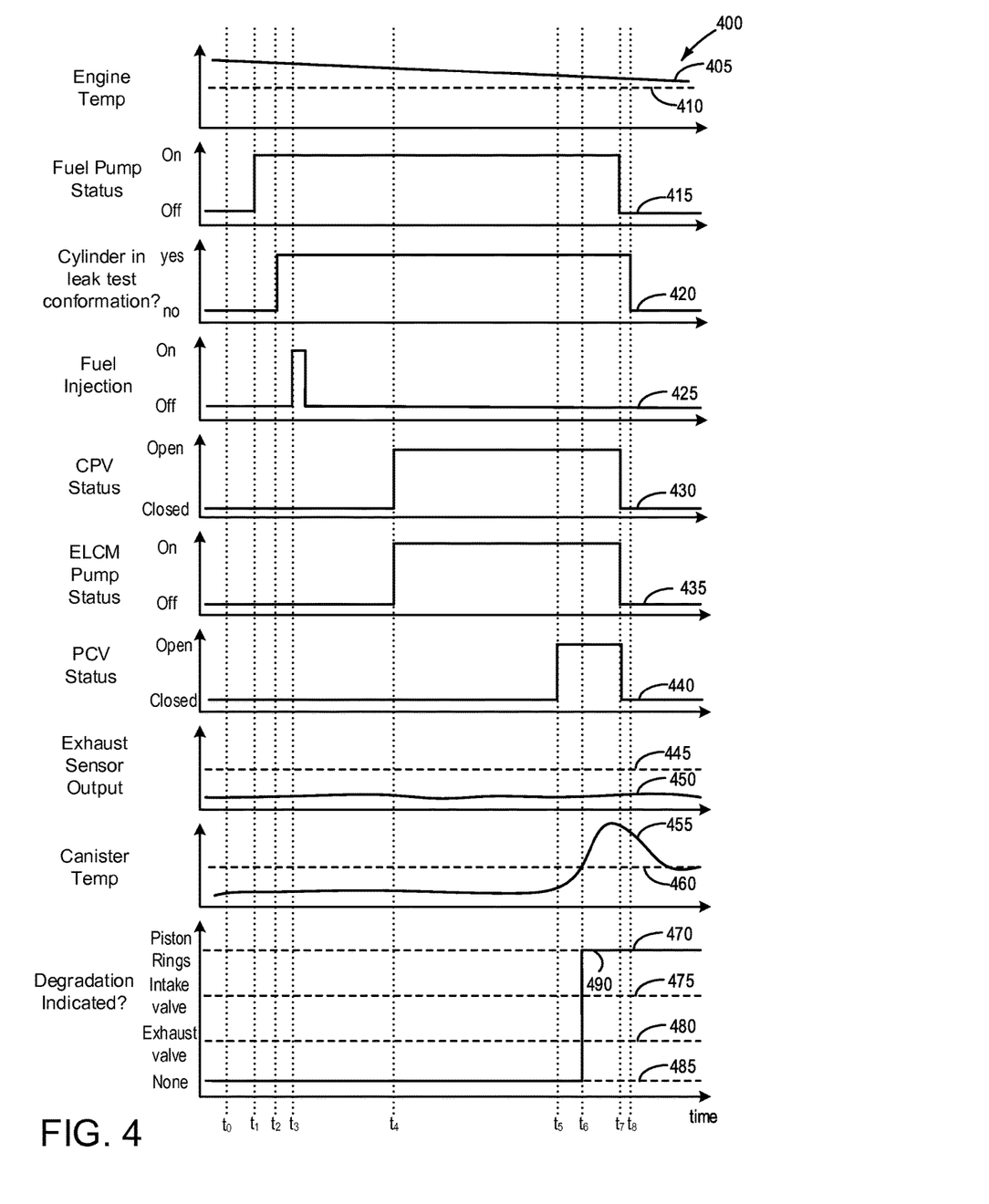
FIG. 4 shows a timeline for an example onboard cylinder leakdown test.

FIG. 4 shows an example timeline 400 for an onboard cylinder leakdown test following an engine-off condition using methods described herein and with respect to FIGS. 3A, 3B, as applied to the systems described herein and with reference to FIGS. 1-2. Timeline 400 includes plot 405, indicating an engine temperature over time. Line 410 indicates a threshold engine temperature. As described with regard to FIG. 3A, an engine temperature above the threshold is indicative of conditions where an onboard leak test may be conducted. Timeline 400 further includes plot 415, indicating an on or off status of the fuel pump over time. Timeline 400 further includes plot 420, indicating whether a cylinder is in a leak test conformation. In this example, and as described with reference to method 300, a cylinder in leak test conformation is placed at TDC with the intake and exhaust valves commanded closed. Timeline 400 further includes plot 425, indicating an on or off status of a fuel injector over time; plot 430, indicating whether a CPV is open or closed over time; plot 435, indicating the on or off status of an ELCM vacuum pump over time; and plot 440, indicating the open or closed status of a PCV valve over time. Timeline 400 further includes plot 450, indicating a relative exhaust sensor output over time. An exhaust sensor output may include an exhaust gas air/fuel ratio via a linear oxygen sensor or UEGO (universal or wide-range exhaust gas oxygen), a two-state oxygen sensor or EGO, a HEGO (heated EGO), a NOx, HC, or CO sensor, such as sensor 64 indicated in FIG. 1. Line 445 indicates a threshold exhaust sensor output. A threshold may be defined as a predetermined value indicating that a defined fraction of fuel expected to volatize under the given conditions has migrated to the exhaust sensor. Timeline 400 further includes plot 455, indicating the temperature of a vapor canister over time. Canister temperature may indicated by a temperature sensor, such as canister temperature sensor 97 in FIG. 1. Line 445 indicates a threshold canister temperature, which may be defined as a predetermined value indicating that a defined fraction of fuel expected to volatize under the given conditions has migrated to the fuel vapor canister. Timeline 400 further includes plot 490, indicating the degradation status of the cylinder piston rings at 470, the cylinder intake valve at 475, the cylinder exhaust valve at 480, or no degradation at 485.

At time $t_0$, the vehicle is in an off-state. Further, at time $t_0$ a cylinder misfire event has been indicated, and no vehicle operating conditions have been indicated that may compromise the integrity of an onboard cylinder leakdown test, as described in regard to the method in FIGS. 3A-3B. Engine temperature indicated by plot 405 is above a threshold 410. Exhaust sensors and canister sensors have been calibrated, as described in regard to the method in FIG. 3. Accordingly, the exhaust sensor output indicated by plot 450 is below the threshold represented by line 445, and the canister temperature indicated by plot 455 is below the threshold represented by line 460.

At time $t_1$, the fuel pump is activated, as indicated by plot 415, and at time $t_2$ the cylinder indicated for onboard leak testing is placed in a leak test conformation, as indicated by plot 420.

At time $t_3$ fuel is injected into the affected cylinder being maintained in leak test conformation, as indicated by plot 425. Engine temperature is above the threshold indicated by line 410, and thus fuel hitting the hot cylinder walls volatizes and HC light ends may migrate out of the cylinder provided there is a leak pathway. Between time $t_3$ and time $t_4$ exhaust sensor output is monitored. As exhaust sensor output remains below threshold between time $t_3$ and time $t_4$, the exhaust valve is not indicated as being degraded as shown at 480 in plot 490.

At time $t_4$, engine temperature remains above threshold, the CPV is opened, as indicated by plot 430, and the ELCM vacuum pump is activated, as indicated by plot 435 in order to direct any fuel vapor leaking from the intake valve into the vapor canister. Accordingly, between time $t_4$ and time $t_5$ canister temperature 460 is monitored. As canister temperature remains below threshold 460 between time $t_4$ and time $t_5$, the intake valve is not indicated as being degraded, as shown at 475 of plot 490.

At time $t_5$ engine temperature remains above a threshold, the ELCM pump remains activated, and the CPV remains open. The PCV is opened, as indicated by plot 440, thus enabling the direction of fuel vapor from the cylinder to the canister via the crankcase if piston rings of the cylinder are degraded. As such, between time $t_5$ and time $t_6$ canister temperature begins to rise, and at time $t_6$ canister temperature crosses a threshold value 460, indicating that fuel injected into the hot cylinder volatized and migrated out of the cylinder to the vapor canister. Accordingly, piston rings are indicated as degraded, indicated at 470 in plot 490.

Between time $t_6$ and $t_7$ canister temperature peaks and begins to decline. As such, the majority of volatized HC has been captured in the canister, thus preventing bleed emissions. The fuel pump and ELCM vacuum pump are thus turned off. Further, the CPV and the PCV are commanded closed.

At time $t_8$ the cylinder indicated for leak test is no longer maintained in leak test conformation, returning the vehicle systems to default conformations for engine startup.

The systems described with reference to FIGS. 1 and 2, along with the methods described herein and with reference to FIGS. 3A and 3B may enable one or more systems and one or more methods. In one example, a method for an engine is provided. The method comprises injecting a quantity of fuel into a first cylinder of the engine while maintaining an intake valve and an exhaust valve of the first cylinder closed during a first condition, including an engine-off condition, and indicating degradation of the first cylinder responsive to hydrocarbon migration out of the cylinder. In such an example, the method may additionally or alternatively comprise positioning the first cylinder at a top dead center conformation prior to injecting fuel into the first cylinder. In any of the preceding examples wherein degradation of the first cylinder is indicated responsive to hydrocarbon migration out of the cylinder, indicating degradation of the first cylinder responsive to hydrocarbon migration out of the first cylinder may additionally or alternatively comprise indicating degradation of the exhaust valve based on hydrocarbon migration out of the first cylinder and into an engine exhaust. In any of the preceding examples where degradation of the exhaust valve is indicated based on hydrocarbon migration out of the first cylinder and into an engine exhaust, the method may additionally or alternatively comprise indicating degradation of the exhaust valve responsive to an output of an exhaust oxygen sensor indicating a decrease in exhaust air-fuel ratio. In any of the preceding examples wherein degradation of the first cylinder is indicated responsive to hydrocarbon migration out of the cylinder, indicating degradation of the first cylinder responsive to hydrocarbon migration out of the first cylinder may additionally or alternatively comprise indicating degradation of the first cylinder based on hydrocarbon migration out of the first cylinder and into a fuel vapor canister. In any of the preceding examples where degradation of the first cylinder is indicated based on hydrocarbon migration out of the first cylinder and into a fuel vapor canister, the method may additionally or alternatively comprise indicating degradation of the first cylinder responsive to an increase in fuel vapor canister temperature above a threshold. In any of the preceding examples wherein degradation of the first cylinder is indicated responsive to an increase in fuel vapor canister temperature above a threshold, the method may additionally or alternatively comprise indicating degradation of the intake valve responsive to an increase in fuel vapor canister temperature above a threshold. In any of the preceding examples where degradation of the intake valve is indicated responsive to an increase in fuel vapor canister temperature above a threshold, the method may additionally or alternatively comprise applying a vacuum to an engine intake while maintaining a canister purge valve open. In any of the preceding examples wherein a vacuum is applied to an engine intake while maintaining a canister purge valve open, the method may additionally or alternatively comprise maintaining a positive crankcase ventilation valve closed. In any of the preceding examples wherein degradation of the first cylinder is indicated responsive to an increase in fuel vapor canister temperature above a threshold, the method may additionally or alternatively comprise indicating degradation of piston rings of the first cylinder responsive to an increase in fuel vapor canister temperature above a threshold. In any of the preceding examples where degradation of piston rings is indicated responsive to an increase in fuel vapor canister temperature above a threshold, the method may additionally or alternatively comprise applying a vacuum to an engine intake while maintaining a canister purge valve open and maintaining a positive crankcase ventilation valve open. In any of the preceding examples, the first condition may additionally or alternatively comprise an engine coolant temperature above a threshold. In any of the preceding examples, the first condition may additionally or alternatively comprise an indication of a misfire of the first cylinder during a previous engine-on condition. The technical result of implementing this method is that leakage in a misfiring cylinder may be diagnosed without requiring an off-board leakdown test. In this way, warrantee costs may be reduced, and further degradation of the cylinder may be prevented by allowing the indicated degradation to be conveyed to a repair mechanic without further invasive testing of the engine.

In another example, a method for an engine is presented, comprising: maintaining a powertrain control module on following a vehicle-off event during a first condition including an engine temperature above a threshold and an indication of a misfire in an engine cylinder, positioning the engine cylinder in top dead center position, commanding an exhaust valve of the engine cylinder closed, commanding an intake valve of the engine cylinder closed, injecting a quantity of fuel into the engine cylinder, and indicating degradation of the exhaust valve responsive to an exhaust oxygen sensor indicating a decrease in exhaust air-fuel ratio. In such an example, the method may additionally or alternatively comprise opening a canister purge valve coupled between a fuel vapor canister and an engine intake, activating a vacuum pump coupled between the fuel vapor canister and atmosphere, and indicating degradation of the engine cylinder responsive to an increase in fuel vapor canister temperature above a threshold. In any of the preceding examples wherein a canister purge valve is opened and a vacuum pump is activated, the method may additionally or alternatively comprise maintaining a positive crankcase ventilation valve closed, and indicating degradation of the intake valve responsive to an increase in fuel vapor canister temperature above a threshold. In any of the preceding examples wherein a canister purge valve is opened and a vacuum pump is activated, the method may additionally or alternatively comprise opening a positive crankcase ventilation valve, and indicating degradation of piston rings of the engine cylinder responsive to an increase in fuel vapor canister temperature above a threshold. The technical effect of implementing this method is a reduction in engine wear due to cylinder misfiring. The method thus allows for cylinder degradation due to leakage to be diagnosed on-board during a vehicle-off condition. In this way, appropriate correction measures may be taken to reduce or eliminate combustion within the degraded cylinder during predetermined engine operating conditions following a subsequent engine-on event.

In yet another example, an engine system is presented, the engine system comprising a fuel vapor canister coupled to an engine intake via a canister purge valve, one or more temperature sensors coupled within the fuel vapor canister, a canister vent line coupled between the fuel vapor canister and atmosphere, an evaporative leak check monitor including a pressure sensor and a vacuum pump coupled to the canister vent line between the fuel vapor canister and atmosphere, an engine block comprising a crankcase and a plurality of cylinders coupled to a crankshaft, each cylinder comprising a piston, one or more piston rings, an intake valve, an exhaust valve, and a fuel injector, a fuel tank coupled to a fuel pump configured to pressurize fuel delivered to the fuel injectors, a positive crankcase ventilation (PCV) line, coupled between the crankcase and the engine intake via a PCV valve, one or more exhaust sensors coupled within an engine exhaust, and a controller holding executable instructions stored in non-transitory memory, that when executed, cause the controller to position a misfiring engine cylinder in a top dead center position during a first condition including an engine-off condition and an indication of a misfiring engine cylinder, command an exhaust valve of the misfiring engine cylinder closed, command an intake valve of the misfiring engine cylinder closed, activate the fuel pump, inject a quantity of fuel into the misfiring engine cylinder via a fuel injector of the misfiring engine cylinder, and indicate degradation of the misfiring engine cylinder responsive to hydrocarbon migration out of the misfiring engine cylinder. In such a system, indicating degradation of the misfiring engine cylinder may additionally or alternatively be based on one or more of an exhaust sensor output change above a threshold and a fuel vapor canister temperature change above a threshold. In any of the preceding examples wherein degradation of the misfiring engine cylinder is based on one or more of an exhaust sensor output change above a threshold and a fuel vapor canister temperature change above a threshold, the controller may additionally or alternatively hold executable instructions stored in non-transitory memory, that when executed, cause the controller to indicate exhaust valve degradation responsive to an exhaust sensor output above a threshold, indicate intake valve degradation responsive to vapor canister temperature above a threshold when the ELCM vacuum pump is activated and the CPV is open, indicate piston ring degradation responsive to vapor canister temperature above a threshold when the ELCM vacuum pump is activated, the CPV is open, and the PCV valve is open, and, responsive to an indication of one or more of exhaust valve degradation, intake valve degradation, or piston ring degradation, adjust engine operating parameters to limit fuel flow and spark to the misfiring cylinder. The technical effect of implementing this system is that cylinder degradation due to poor compression may be diagnosed on-board without requiring additional hardware or components. In this way, manufacturing costs may be maintained, while also reducing manufacturer warrantee costs stemming from off-board cylinder analysis.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle driven by an engine, comprising:

operating the vehicle with an engine temperature above a threshold and an indication of a misfire in an engine cylinder, until a vehicle-off event is detected;

upon detection of the vehicle-off event, maintaining a powertrain control module onboard the vehicle on to perform an onboard leak test, the powertrain control module including a processor and a memory storing instructions executable by the processor, the powertrain control module coupled to a plurality of powertrain sensors and a plurality of powertrain actuators; and performing the onboard leak test by:

spinning the engine unfueled to position the engine cylinder in a top dead center position;

commanding an exhaust valve of the engine cylinder closed;

commanding an intake valve of the engine cylinder closed;

injecting a quantity of fuel into the engine cylinder while the engine cylinder is maintained at the top dead center position and the exhaust valve and the intake valve are closed; and upon injecting the quantity of fuel, indicating degradation of the exhaust valve responsive to an exhaust oxygen sensor indicating a decrease in exhaust air-fuel ratio.

2. The method of claim 1, wherein performing the onboard leak test further includes:
upon injecting the quantity of fuel, opening a canister purge valve coupled between a fuel vapor canister and an engine intake and activating a vacuum pump coupled between the fuel vapor canister and atmosphere; and
upon activating the vacuum pump, indicating degradation of the engine cylinder responsive to an increase in fuel vapor canister temperature above a threshold.

3. The method of claim 2, wherein performing the onboard leak test further includes:
maintaining a positive crankcase ventilation valve closed; and
upon activating the vacuum pump, indicating degradation of the intake valve responsive to an increase in fuel vapor canister temperature above the threshold.

4. The method of claim 2, wherein performing the onboard leak test further includes:
upon activating the vacuum pump, opening a positive crankcase ventilation valve; and
upon opening the positive crankcase ventilation valve, indicating degradation of piston rings of the engine cylinder responsive to an increase in fuel vapor canister temperature above the threshold.

5. An engine system, comprising:
a fuel vapor canister coupled to an engine intake via a canister purge valve;
one or more temperature sensors coupled within the fuel vapor canister;
a canister vent line coupled between the fuel vapor canister and atmosphere;
an evaporative leak check monitor including a pressure sensor and a vacuum pump coupled to the canister vent line between the fuel vapor canister and atmosphere;
an engine block comprising a crankcase and a plurality of cylinders coupled to a crankshaft, each cylinder comprising a piston, one or more piston rings, an intake valve, an exhaust valve, and a fuel injector;
a fuel tank coupled to a fuel pump configured to pressurize fuel delivered to the fuel injectors;
a positive crankcase ventilation (PCV) line, coupled between the crankcase and the engine intake via a PCV valve;
one or more exhaust sensors coupled within an engine exhaust; and
a controller holding executable instructions stored in non-transitory memory, that when executed, cause the controller to:
during a first condition, including an engine-off condition and an indication of a misfiring engine cylinder, position the misfiring engine cylinder in a top dead center position;
command an exhaust valve of the misfiring engine cylinder closed;
command an intake valve of the misfiring engine cylinder closed;
activate the fuel pump;
inject a quantity of fuel into the misfiring engine cylinder via a fuel injector of the misfiring engine cylinder; and
indicate degradation of the misfiring engine cylinder responsive to hydrocarbon migration out of the misfiring engine cylinder.

6. The engine system of claim 5, wherein indicating degradation of the misfiring engine cylinder is based on one or more of an exhaust sensor output change above a threshold and a fuel vapor canister temperature change above a threshold.

7. The engine system of claim 6, wherein the controller further holds executable instructions stored in non-transitory memory, that when executed, cause the controller to:
indicate exhaust valve degradation responsive to an exhaust sensor output above a threshold;
indicate intake valve degradation responsive to vapor canister temperature above a threshold when the ELCM vacuum pump is activated and the CPV is open;
indicate piston ring degradation responsive to vapor canister temperature above a threshold when the ELCM vacuum pump is activated, the CPV is open, and the PCV valve is open; and,
responsive to an indication of one or more of exhaust valve degradation, intake valve degradation, or piston ring degradation, adjust engine operating parameters to limit fuel flow and spark to the misfiring cylinder.

\* \* \* \* \*